(12) United States Patent
Tse

(10) Patent No.: US 7,497,337 B2
(45) Date of Patent: *Mar. 3, 2009

(54) APPARATUS FOR PIERCING GARBAGE BAGS, WASHING MATERIALS RELEASED FROM THE PIERCED GARBAGE BAGS, AND COLLECTING NONRIGID, ELONGATE OBJECTS AND POWDER

(75) Inventor: Steven Tse, Guangzhou (CN)

(73) Assignee: WST International (Holdings) Limited, Victoria Mahe (SC)

( * ) Notice: Subject to any disclaimer, the term of this patent is extended or adjusted under 35 U.S.C. 154(b) by 178 days.

This patent is subject to a terminal disclaimer.

(21) Appl. No.: 11/517,141

(22) Filed: Sep. 6, 2006

(65) Prior Publication Data

US 2007/0084760 A1    Apr. 19, 2007

Related U.S. Application Data

(63) Continuation-in-part of application No. 11/250,802, filed on Oct. 13, 2005, now Pat. No. 7,416,084.

(51) Int. Cl.
*B07C 9/00*    (2006.01)
*B07B 1/24*    (2006.01)
*B02C 17/20*    (2006.01)

(52) U.S. Cl. ............ 209/294; 209/284; 209/627; 209/683; 209/688; 209/616; 414/412; 241/299

(58) Field of Classification Search .......... 209/930, 209/688, 689, 690, 284, 287, 288, 289, 293, 209/294, 296, 297, 298, 299, 257, 615, 616, 209/627, 680, 683; 414/412; 241/74, 299
See application file for complete search history.

(56) References Cited

U.S. PATENT DOCUMENTS

| | | | | | |
|---|---|---|---|---|---|
| 5,163,627 | A | * | 11/1992 | Bouche | 241/23 |
| 5,339,961 | A | * | 8/1994 | Mayhak | 209/3 |
| 6,003,680 | A | * | 12/1999 | Finn | 209/616 |
| 6,955,265 | B2 | * | 10/2005 | Tse | 209/683 |

* cited by examiner

*Primary Examiner*—Patrick H Mackey
*Assistant Examiner*—Mark Hageman
(74) *Attorney, Agent, or Firm*—Ware, Fressola, Van Der Sluys & Adolphson, LLP

(57) ABSTRACT

An apparatus for disposing garbage bags in one embodiment includes a screen assembly including a first conveyor for conveying garbage bags from a feeding device to a hollow screening cylinder for piercing, and a second conveyor mounted below a rear discharge opening of the cylinder for conveying materials released from the pierced bags to a subsequent station; a nonrigid, elongate object collection assembly extended from within the cylinder to a place rearward of the cylinder, a gable roof mounted on an elongate housing, a lengthwise gap formed on a top of the gable roof, and a second container mounted below a rear end of the object collection assembly for collecting nonrigid, elongate objects dropped therefrom; and a washing assembly including one or more sets of pump and pipe having nozzles terminated within the cylinder for washing the released materials.

11 Claims, 16 Drawing Sheets

FIG. 4 (Section A-A)

FIG. 13(Section B-B)

APPARATUS FOR PIERCING GARBAGE BAGS, WASHING MATERIALS RELEASED FROM THE PIERCED GARBAGE BAGS, AND COLLECTING NONRIGID, ELONGATE OBJECTS AND POWDER

CROSS-REFERENCE TO RELATED APPLICATIONS

This application is a continuation-in-part of my application Ser. No. 11/250,802 filed Oct. 13, 2005 now U.S. Pat. No. 7,416,084 for "Apparatus for Piercing Garbage Bags and Collecting Nonrigid, Elongate Objects and Powder".

BACKGROUND OF THE INVENTION

1. Field of Invention

The present invention relates to waste management apparatuses, and more particularly to an apparatus for piercing garbage bags, washing materials released from the pierced garbage bags, and collecting nonrigid, elongate objects and powder therefrom with improved characteristics.

2. Description of Related Art

It is known that a wide variety of materials are contained in garbage. Typically, garbage collection employees have to open garbage bags to find recyclable items contained therein. This is a difficult, dangerous job since stained materials, household hazardous wastes, medical wastes, or the like may contain in garbage bags. Thus, continuing improvements in the exploitation of waste management apparatus involving piercing, washing, and collecting useful materials therefrom so as to facilitate subsequent processing are constantly being sought.

SUMMARY OF THE INVENTION

In one aspect of the present invention, the present invention provides a first apparatus for disposing garbage bags comprising a rotatable, hollow, cylindrical screen assembly for sifting powder including a feeding device spaced from a front end, a first conveyor adapted to convey the garbage bags from the feeding device to the screen assembly, an inclined board extended downwardly from a lower portion of a rear end of the screen assembly, and a second conveyor provided below the board, the second conveyor being adapted to convey materials leaving the screen assembly to a subsequent station for processing; and a nonrigid, elongate object collection assembly extended from a rear end of the screen assembly through the screen assembly to a point in front of the screen assembly, the object collection assembly including an elongate housing of rectangular section, a gable roof provided on the housing, a lengthwise gap formed on a top of the gable roof, and a first container provided below a rear end of the object collection assembly for collecting nonrigid, elongate objects dropped therefrom.

In another aspect of the present invention, the present invention provides a second apparatus for disposing garbage bags comprising a rotatable screen assembly including a hollow screening cylinder, a feeding device spaced from a front end, a first conveyor adapted to convey the garbage bags from the feeding device to the screening cylinder, a first container mounted under the screening cylinder, and a second conveyor mounted below a rear discharge opening of the screening cylinder, the second conveyor being adapted to convey materials leaving the screening cylinder to a subsequent station for processing; a nonrigid, elongate object collection assembly extended from within the screening cylinder to a place rearward of the screening cylinder, the object collection assembly including an elongate housing of rectangular section, a gable roof mounted on the housing, a lengthwise gap formed on a top of the gable roof, and a second container mounted below a rear end of the object collection assembly for collecting nonrigid, elongate objects dropped therefrom; and a washing assembly comprising one or more sets of a pump, a pipe, and a valve in the pipe. The pipe has one end terminated within the screening cylinder and formed as one or more nozzles for spraying water onto an inner surface of the screening cylinder, and the other end connected to the pump.

The second apparatus for disposing garbage bags can wash materials released from the pierced garbage bags within the screen assembly so as to get rid of dirt, oily materials, etc., and dilute hazardous materials. And in turn, the present invention can increases environmental safety in any subsequent processing including recycling.

Further, the second apparatus for disposing garbage bags can wash materials released from the pierced garbage bags within the screen assembly so as to wash off mud, dust, sand, etc. for maintaining a smooth operation of the second apparatus. Otherwise, a plurality of rectangular holes formed on the cylinder may be clogged by garbage after a period time of operation.

The above and other objects, features and advantages of the present invention will become apparent from the following detailed description taken with the accompanying drawings.

DETAILED DESCRIPTION OF THE INVENTION

Figure 1:
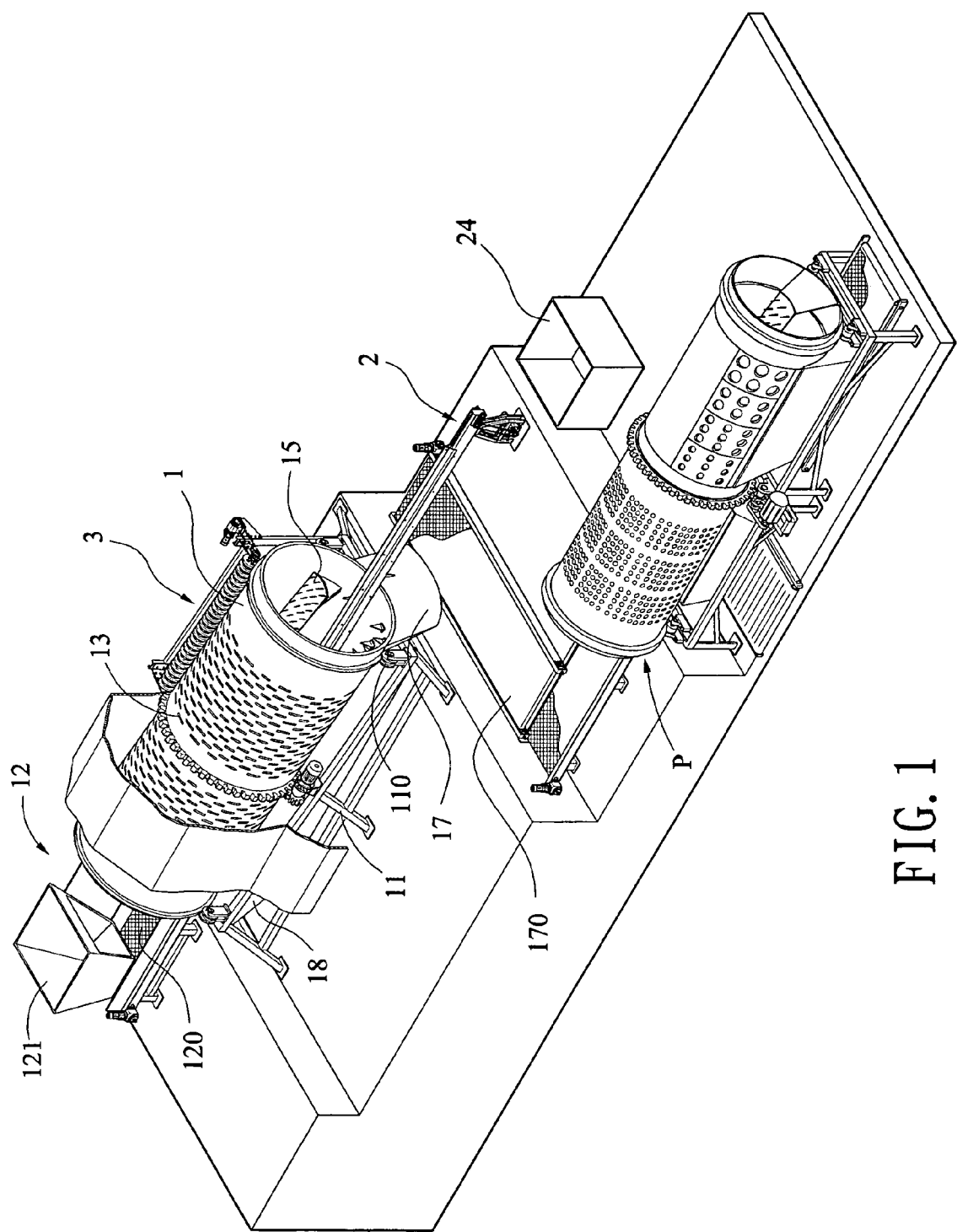
FIG. 1 is a perspective view of a first preferred embodiment of apparatus for disposing garbage bags according to the invention.
Figure 2:
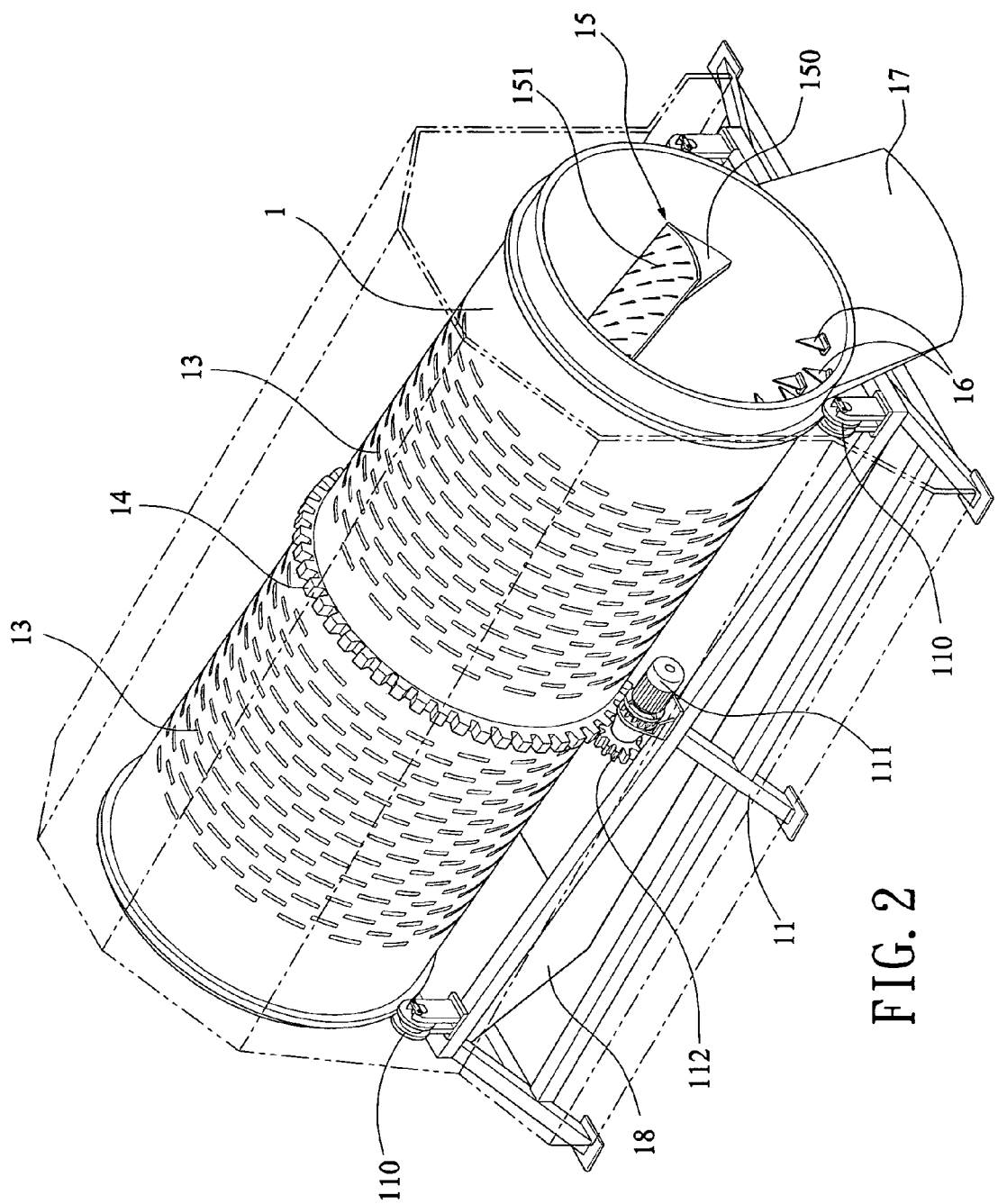
FIG. 2 is a greatly enlarged perspective view of the screen assembly in FIG. 1.
Figure 3:
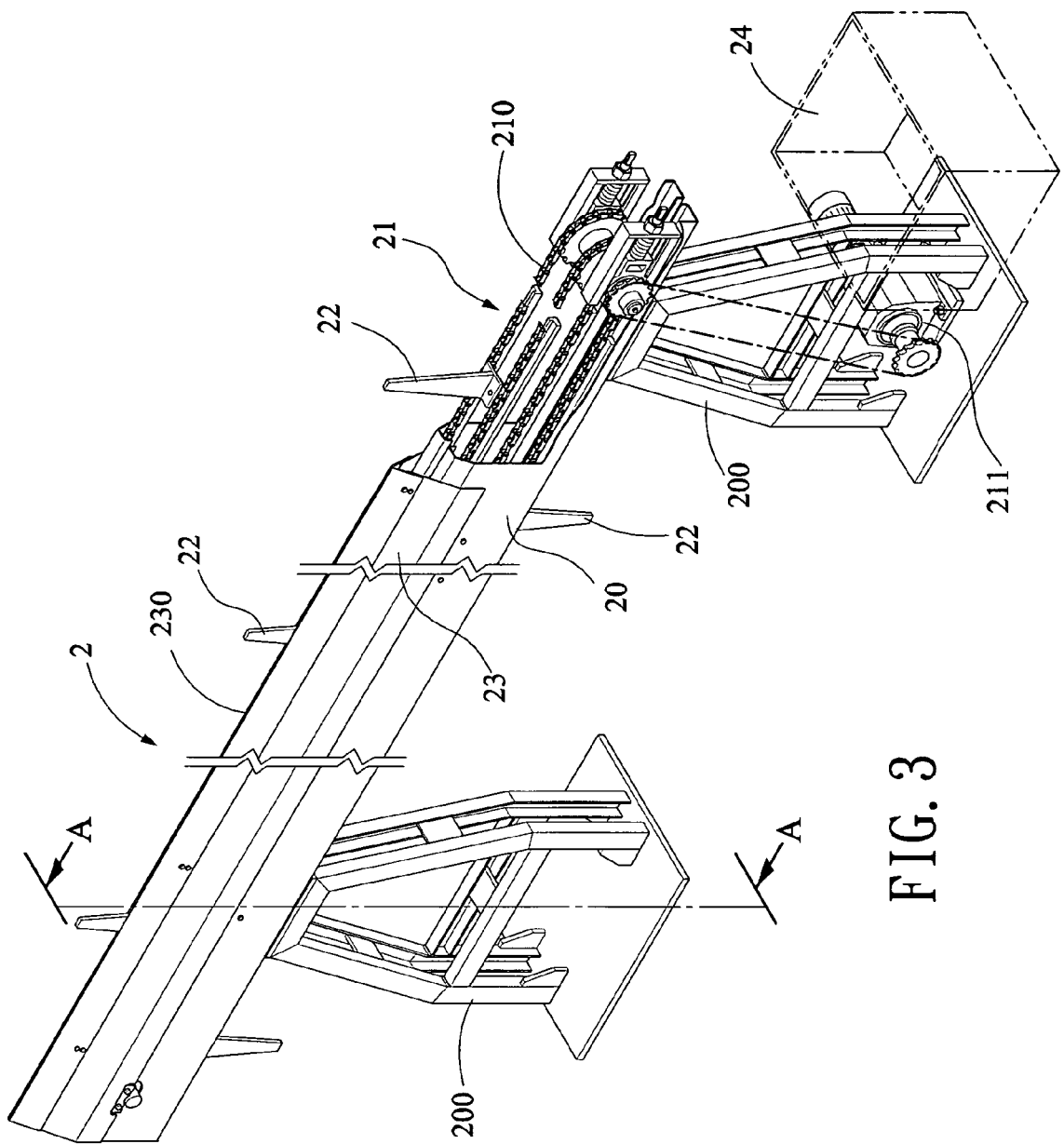
FIG. 3 is a greatly enlarged perspective view in part broken away of the nonrigid, elongate object collection assembly in FIG. 2.
Figure 4:
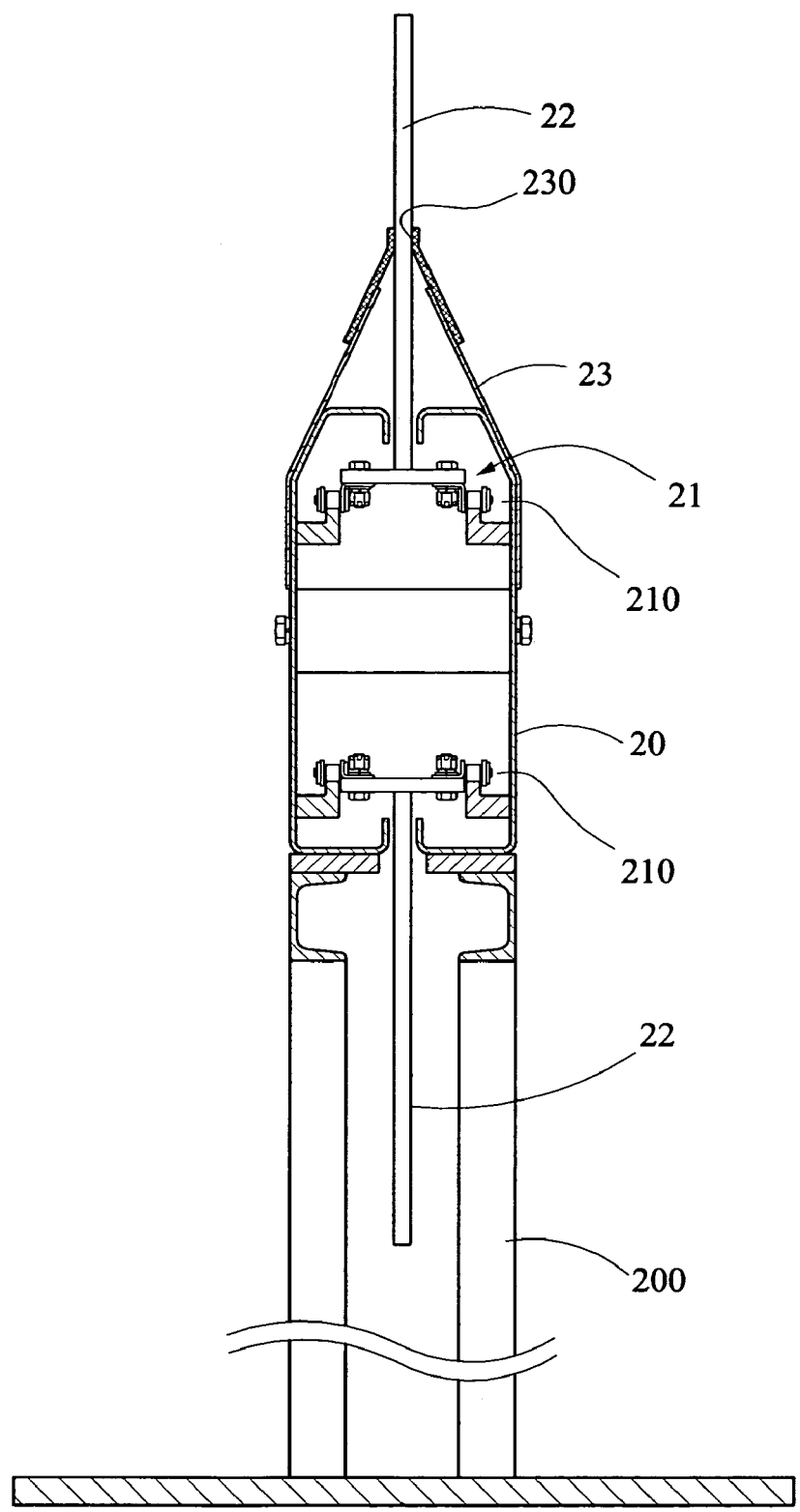
FIG. 4 is a sectional view taken along line A-A in FIG. 3.

Referring to FIGS. 1 to 7, an apparatus for disposing garbage bags in accordance with a first preferred embodiment of the invention is shown. The apparatus comprises a screen assembly 1, a nonrigid, elongate object collection assembly 2, and a cleaning assembly 3. Each component is discussed in detailed below.

The screen assembly 1 is a hollow cylinder and comprises a support 11 for obliquely supporting the screen assembly 1. Preferably, the screen assembly 1 is inclined about 4 degree from a front end to a rear end with respect to a supporting platform (i.e., front end is higher than rear end). The support 11 comprises two sets of rollers 110 at either side for rotatably supporting the screen assembly 1 above the supporting platform by a distance. A funnel-shaped first container 18 is provided under the screen assembly 1.

A feeding device 12 is provided in the front of the screen assembly 1. The feeding device 12 comprises a chute 121 and a first conveyor 120 below the chute 121, the first conveyor 120 being adapted to convey garbage bags from the chute 121 to the screen assembly 1. The first conveyor 120 is supported by legs.

A plurality of rectangular holes 13 are formed on an outer surface of the screen assembly 1. Preferably, the hole 13 has a length of 15 cm and a width of 4 cm such that powder having a diameter less than 4 cm can be separated by the screen assembly 1.

A gear 14 is formed around an intermediate portion of the screen assembly 1. A pinion 112 is provided at one side of the screen assembly 1 and is in gear engagement with the gear 14. A drive source (e.g., motor) 111 is adapted to drive the pinion 112 such that the screen assembly 1 may rotate about the support 11 in response to activating the drive source 111.

A lengthwise plate 15 having a curved surface is provided on an inner surface of the screen assembly 1. The plate 15 is supported by a bracket 150 fixedly connected to the inner surface of the screen assembly 1. The plate 15 comprises a plurality of paws 151 on the curved surface. A plurality of short, pointed blades 16 are also formed on the inner surface of the screen assembly 1. The pointed blades 16 are also disposed lengthwise and are disposed in opposing relationship with the plate 15. An inclined board 17 having a curved surface is extended downwardly from a lower portion of the rear end of the screen assembly 1. A second conveyor 170 is provided below the board 17. The second conveyor 170 is adapted to convey materials leaving the screen assembly 1 to a subsequent device for further processing.

The inclined nonrigid, elongate object collection assembly 2 is extended from the rear of the screen assembly 1 through the screen assembly 1 to a place in front of the screen assembly 1. The nonrigid, elongate object collection assembly 2 comprises an elongate housing 20 having a rectangular section. The housing 20 is supported by two supports 200 in which one higher support 200 is provided above the first conveyor 120 and one lower support 200 is provided in the rear of the screen assembly 1. An endless transmission 21 is enclosed by the housing 20. The transmission 21 comprises two parallel endless chains 210 and is driven by a drive source (e.g., motor) 211 by means of a transmission belt. A plurality of equally spaced posts 22 are fixedly connected between the parallel chains 210. A gable roof 23 is formed on the housing 20. A lengthwise gap 230 is formed on a top of the gable roof 23. The gap 230 is sufficiently wide for permitting the posts 22 to project therefrom. Also, the roof 23 is adapted to prevent garbage materials on the inner surface of the screen assembly 1 from falling onto the chains 210 through the gap 230 when the transmission 21 is activating. A second container 24 is provided below a rear end of the nonrigid, elongate object collection assembly 2 for collecting nonrigid, elongate objects dropped therefrom.

In operation, first turn on the drive source 111 to rotate the screen assembly 1 and turn on the drive source 211 to activate the nonrigid, elongate object collection assembly 2. The transmission 21 and thus the posts 22 move around. A plurality of garbage bags are thrown into the chute 121 of the feeding device 12 prior to conveying to the screen assembly 1 by the first conveyor 120. The pointed blades 16 are adapted to pierce garbage bags rotating around the inner surface of the activating screen assembly 1. Contents in the garbage bags are thus scattered in the screen assembly 1. Also, the paws 151 of the plate 15 are adapted to hold nonrigid, elongate objects A and materials B other than nonrigid, elongate objects may fall from the plate 15 onto bottom of the rotating screen assembly 1. Powder and small objects are contained in the materials B other than nonrigid, elongate objects in which powder passes through the holes 13 to fall onto the first container 18 under the screen assembly 1.

Figure 5:
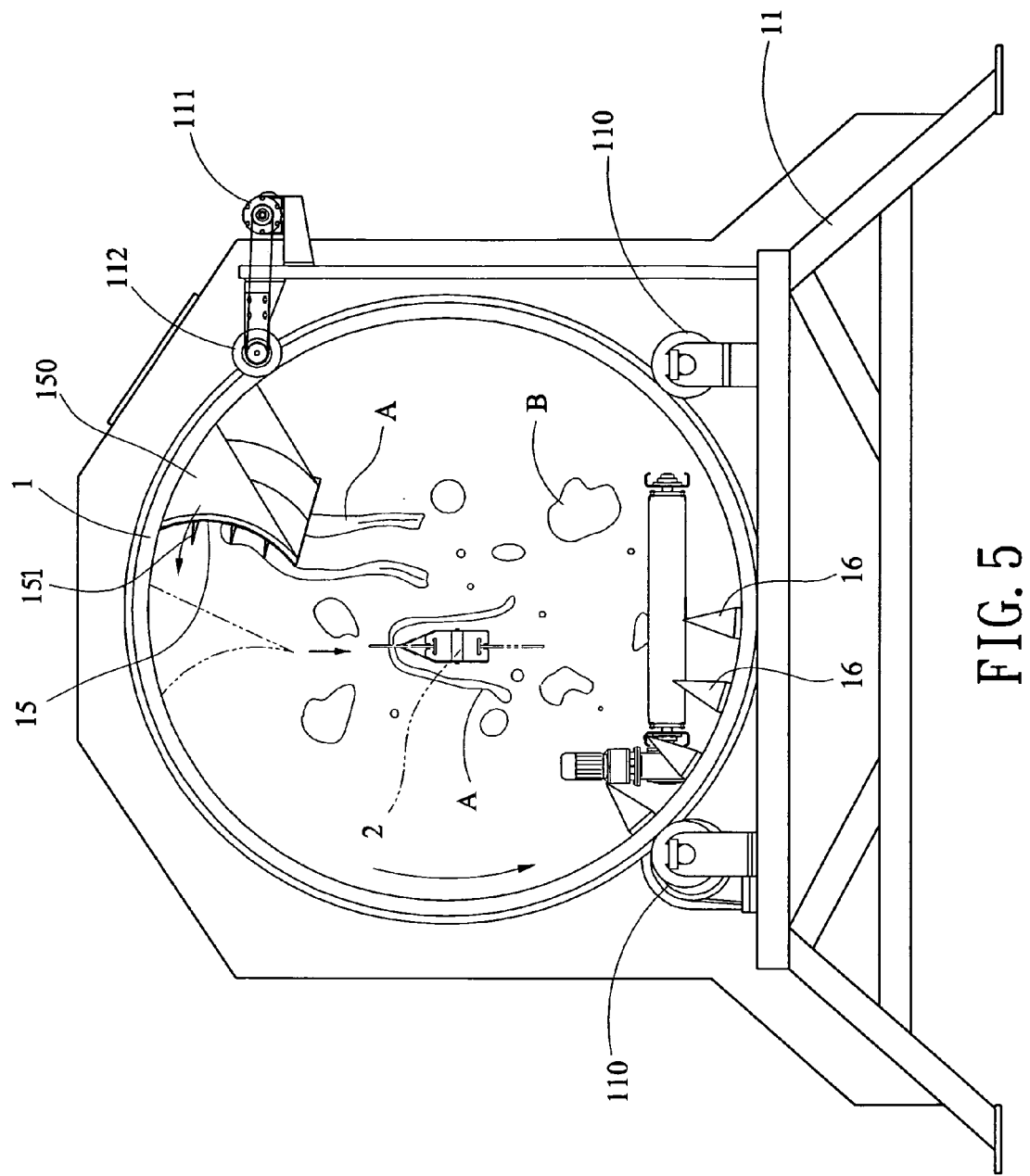
FIG. 5 is a front view of the apparatus schematically depicting an operation of disposing garbage according to the invention.
Figure 6:
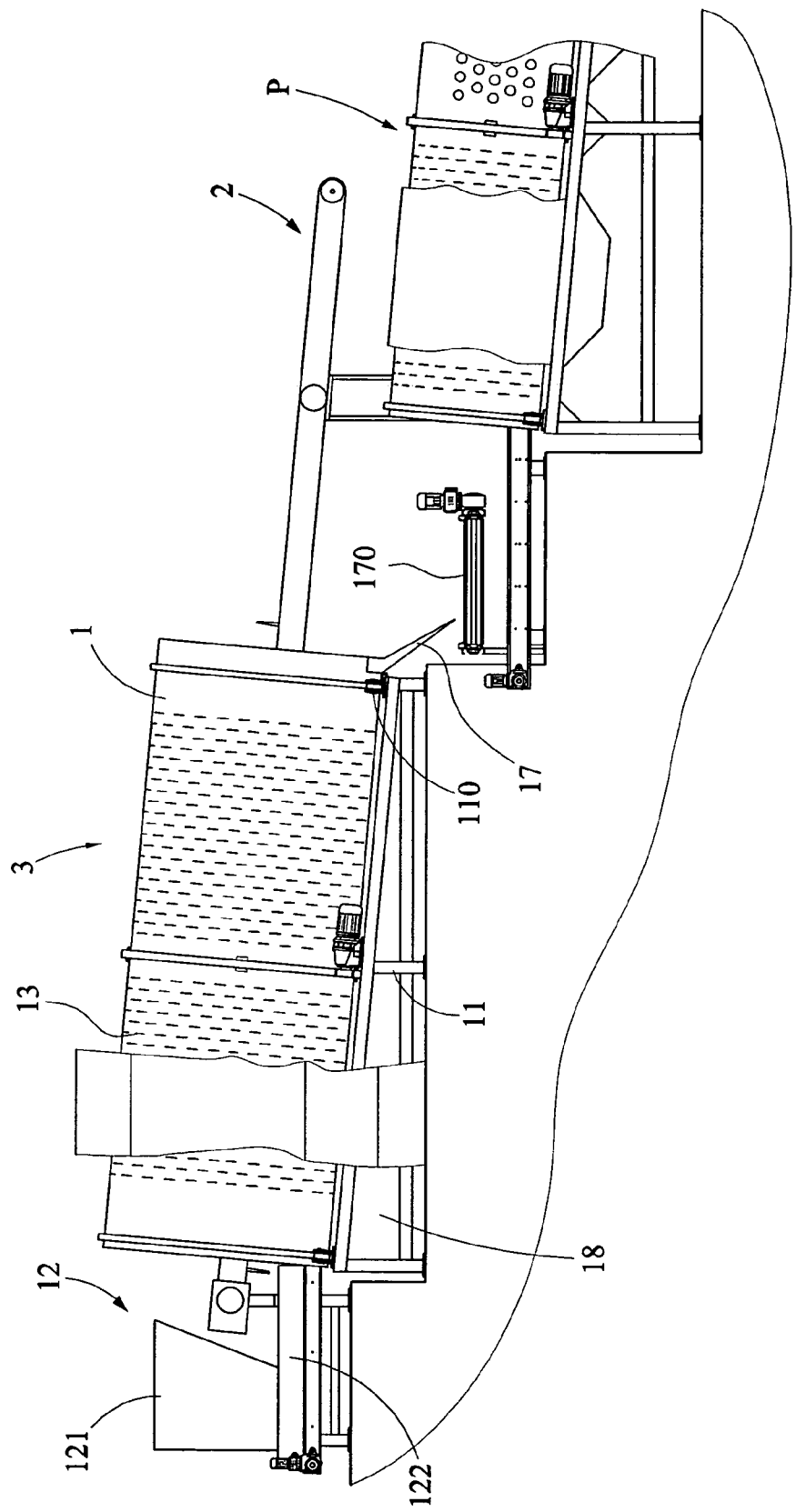
FIG. 6 is a side view of a portion of the apparatus in FIG. 1.

The nonrigid, elongate objects A may fall from the plate 15 due to gravity when the plate 15 rotates to a highest point in the screen assembly 1. The pointed top end of the post 22 thus may grab the fallen nonrigid, elongate objects A, as shown in FIG. 5. It is often that the nonrigid, elongate objects A may extend across both sides of the roof 23 (see FIG. 5) since the nonrigid, elongate object A is elongate. At the same time, the posts 22 move along the roof 23 toward the second container 24. At the forward end of the housing 20 the nonrigid, elongate objects A may fall into the second container 24. The posts 22 may continue its movement by moving to a lower half of the housing 20 in one cycle.

Garbage materials other than nonrigid, elongate objects A and powder may move toward the rear end of the screen assembly 1. Finally, they fall onto the second conveyor 170 through the inclined board 17. These materials are then conveyed to a subsequent device P for further processing. Detailed description of the subsequent processing is omitted herein because it is not the subject of the invention.

Figure 7:
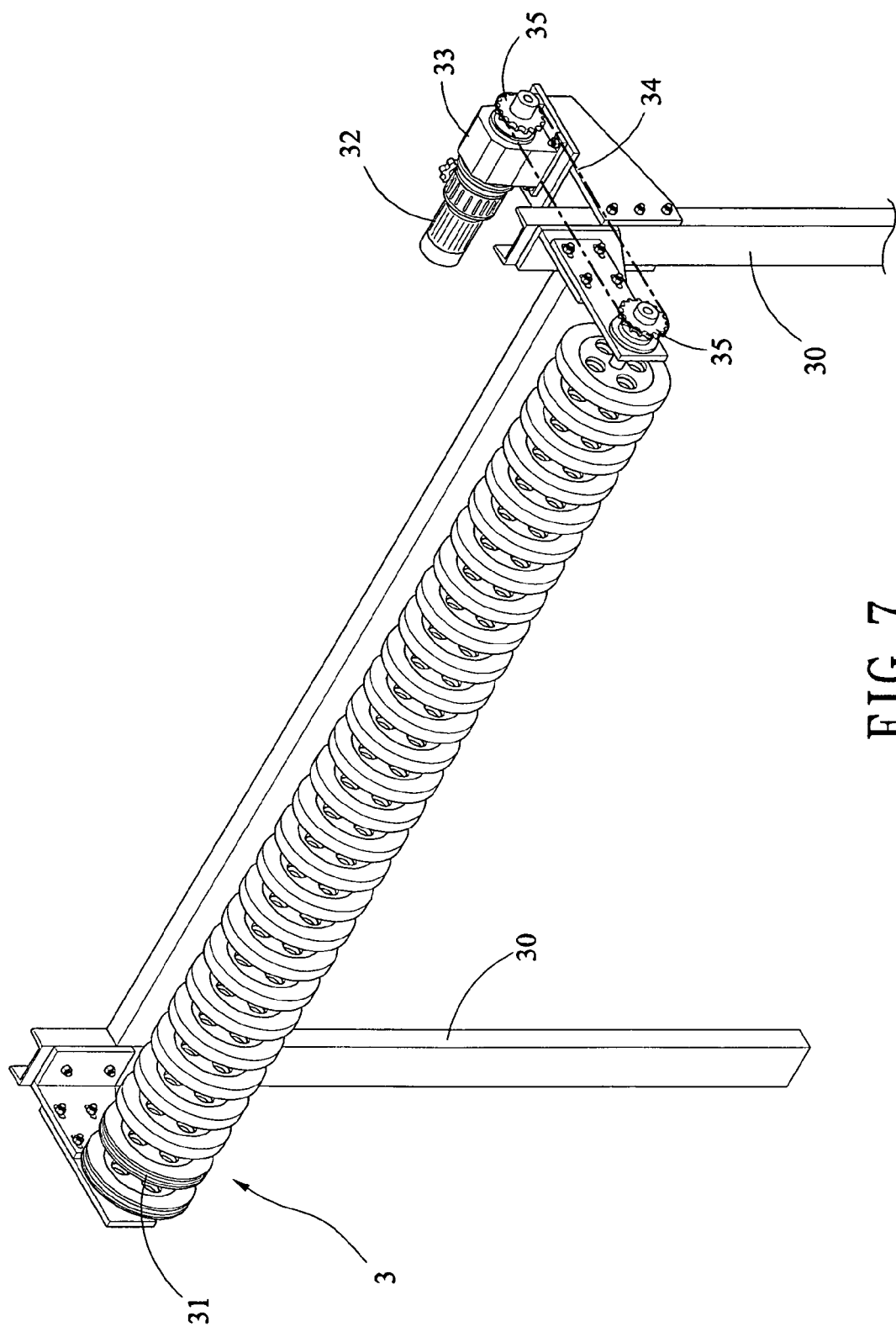
FIG. 7 is a perspective view of the cleaning assembly in FIG. 1.
Figure 8:
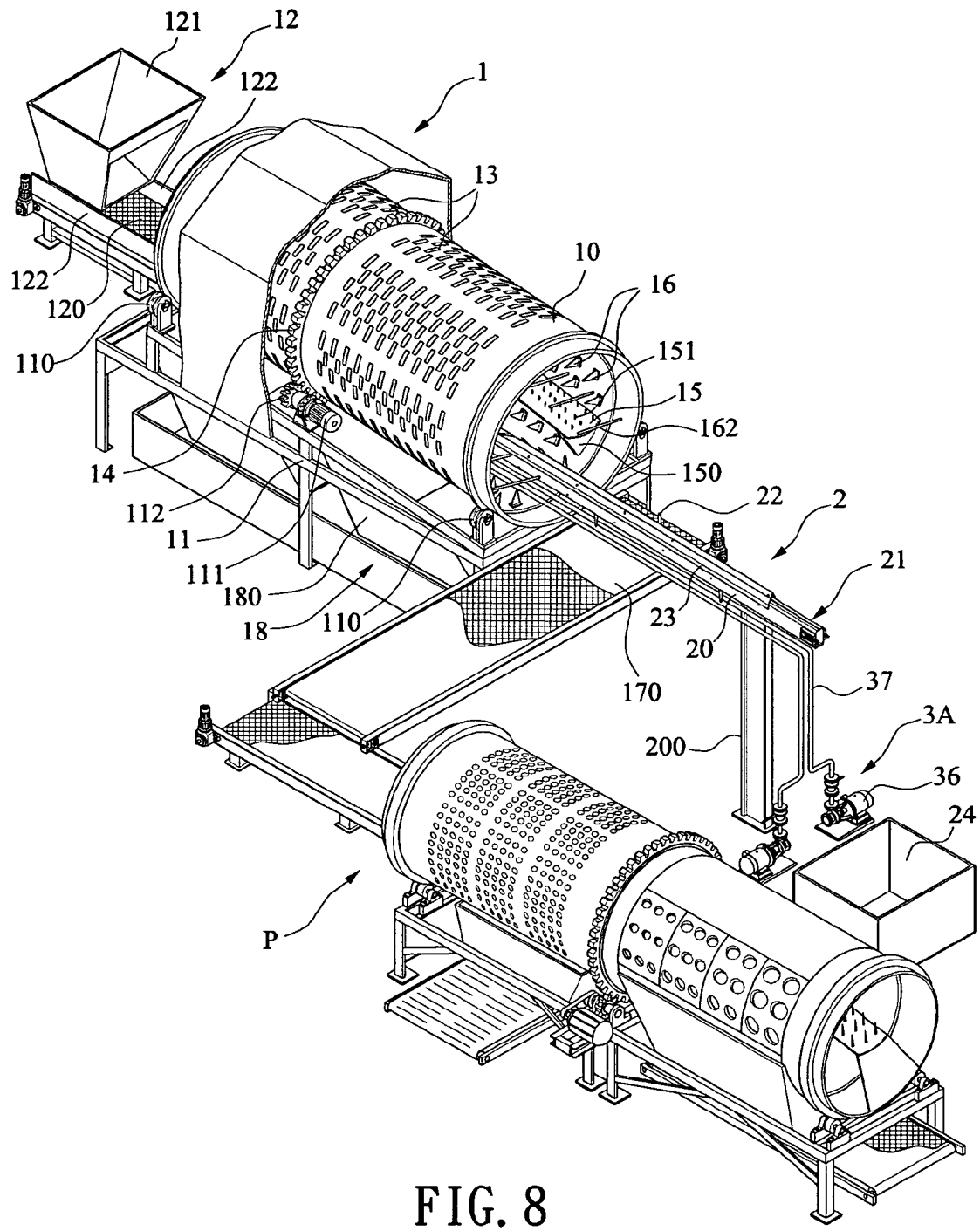
FIG. 8 is a perspective view of a second preferred embodiment of apparatus for disposing garbage bags according to the invention.
Figure 9:
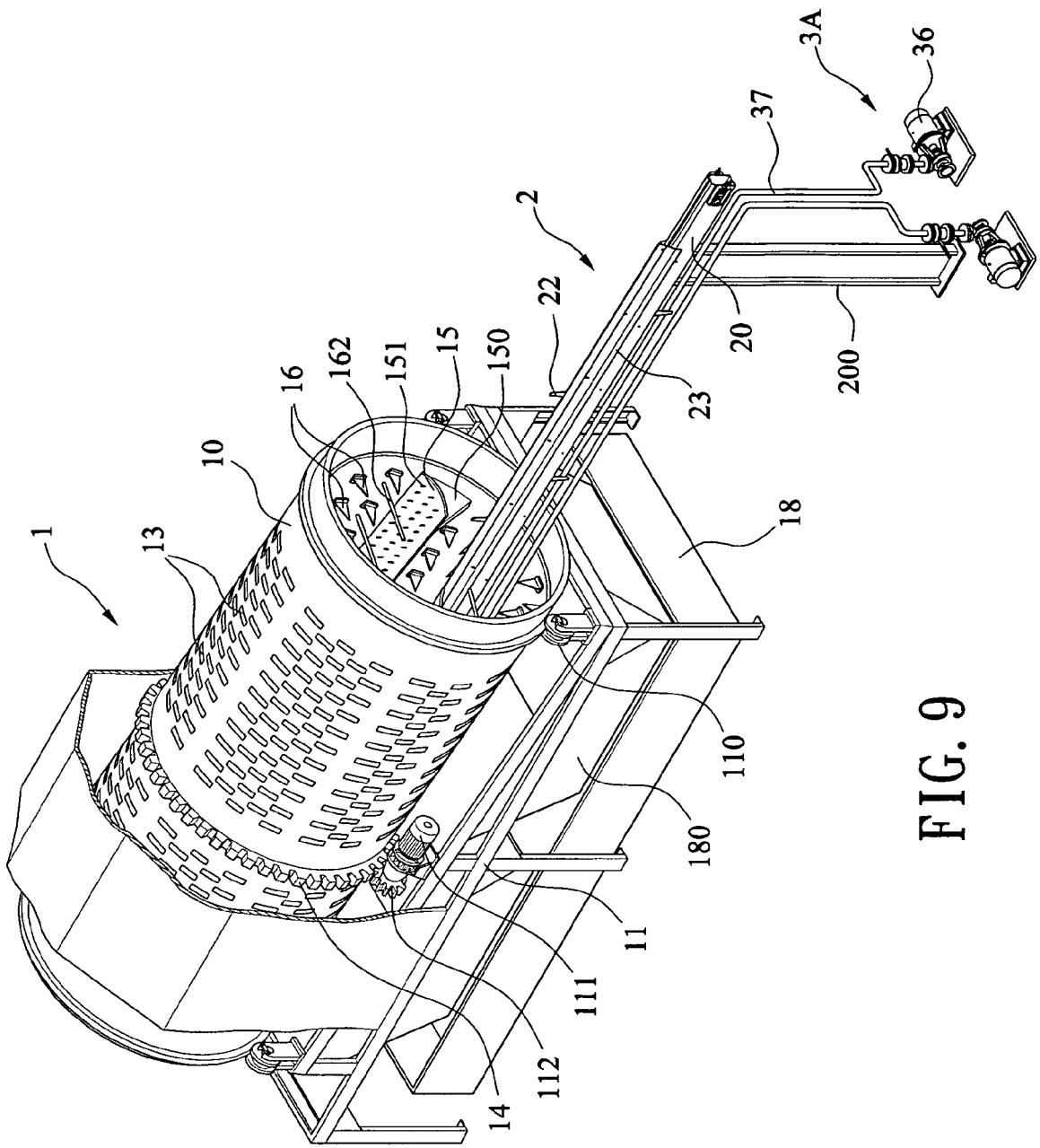
FIG. 9 is a greatly enlarged perspective view of the screen assembly, the nonrigid, elongate object collection assembly, and the washing assembly in FIG. 8.

Referring to FIGS. 1 and 7 specifically, the holes 13 on the screen assembly 1 may be blocked by garbage after a period time of operation. Thus, a cleaning assembly 3 is provided at an upper or a side portion along one longitudinal side of the screen assembly 1 and is disposed facing the holes 13. The cleaning assembly 3 comprises two spaced brackets 30. A plurality of brush wheels 31 are rotatably formed on a drive shaft between the brackets 30. Each of the brush wheels 31 is formed of hard bristles. The brush wheels 31 are driven by a motor 32 through a gearbox 33, two spaced wheels 35, and a transmission chain 34 put around the wheels 35. In case of blockage in the holes 13, an employee may turn on the motor 32 to push the brush wheels 31 to contact the holes 13 and rotate the brush wheels 31 for cleaning the blockage. Alternatively, the activation of the motor 32 for cleaning may be regular by setting.

Referring to FIGS. 8 to 15A, an apparatus for disposing garbage bags in accordance with a second preferred embodiment of the invention is shown. The apparatus comprises a screen assembly 1, a nonrigid, elongate object collection assembly 2, and a washing assembly 3A. Each component is discussed in detailed below.

The screen assembly 1 comprises a hollow cylinder 10 having two open ends, and a lower support 11 for obliquely supporting the cylinder 10. Preferably, the cylinder 10 is inclined about 4-degree from a front end to a rear end with respect to a supporting platform (not shown) (i.e., the front end is higher than the rear end). The support 11 comprises two set of rollers 110 at either side for rotatably supporting the cylinder 10 above the supporting platform by a distance. A first container 18 is provided under the cylinder 10 and comprises an upper funnel 180 provided under the cylinder 10.

A feeding device 12 is provided in the front of cylinder 10. The feeding device 12 comprises an upper chute 121 and a first conveyor 120 below the chute 121, the first conveyor 120 being adapted to convey garbage bags from the chute 121 to the cylinder 10. The first conveyor 120 is supported by two raised supporting members 122 at both sides respectively.

A plurality of rectangular holes 13 are formed on an outer surface of the screen assembly 1. Preferably, the hole 13 has a length of 15 cm and a width of 4 cm such that powder having a diameter less than 4 cm can be separated by the screen assembly 1. A gear 14 is formed around an intermediate portion of the cylinder 10. A pinion 112 is provided at one side of the cylinder 10 and is in gear engagement with the gear 14. A drive source (e.g., motor) 111 is adapted to drive the pinion 112 such that the cylinder 10 may rotate about the support 11 in response to activating the drive source 111.

A lengthwise plate 15 having a curved surface is provided on an inner surface of the cylinder 10. The plate 15 is supported by a bracket 150 fixedly connected to the inner surface of the cylinder 10. The plate 15 comprises a plurality of paws 151 on the curved surface. A plurality of lengthwise short, pointed blades 16 are formed on the inner surface of the cylinder 10. A plurality of lengthwise rows of elongate bars 162 are also formed on the inner surface of the cylinder 10. A second conveyor 170 is provided below the rear end of the cylinder 10. The second conveyor 170 is adapted to convey materials leaving the cylinder 10 to a subsequent device P for further processing.

The inclined nonrigid, elongate object collection assembly 2 is extended from within the cylinder 10 to a place rearward of the cylinder 10. The nonrigid, elongate object collection assembly 2 comprises an elongate housing 20 having a rectangular section. The housing 20 is supported by two supports 200 in which one higher support 200 is provided above the first conveyor 120 and one lower support 200 is provided rearward of the cylinder 10. An endless transmission 21 is enclosed by the housing 20. The transmission 21 comprises two parallel endless chains 210 and is driven by a drive source (e.g., motor) (not shown) by means of a transmission belt (not shown). A plurality of equally spaced posts 22 are fixedly connected between the parallel chains 210. A gable roof 23 is formed on the housing 20. A lengthwise gap 230 is formed on a top of the gable roof 23. The gap 230 is sufficiently wide to permit the posts 22 to project therefrom. Also, the roof 23 is adapted to prevent garbage materials on the inner surface of the cylinder 10 from falling onto the chains 210 through the gap 230 when the transmission 21 is activating. A second container 24 is provided below a rear end of the nonrigid, elongate object collection assembly 2 for collecting nonrigid, elongate objects dropped therefrom.

Figure 14:
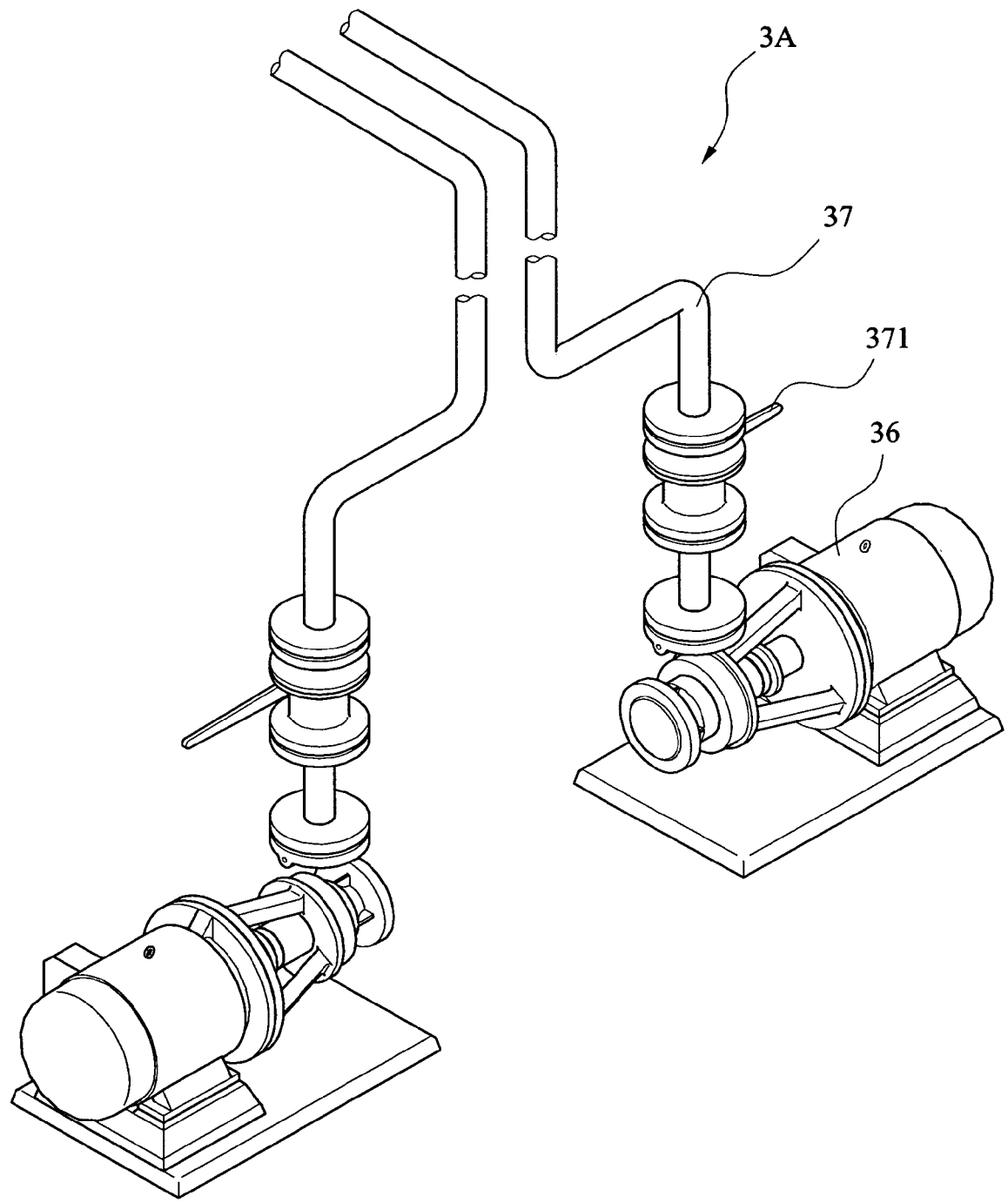
FIG. 14 is a perspective view of the washing assembly in FIG. 8.
Figure 15:
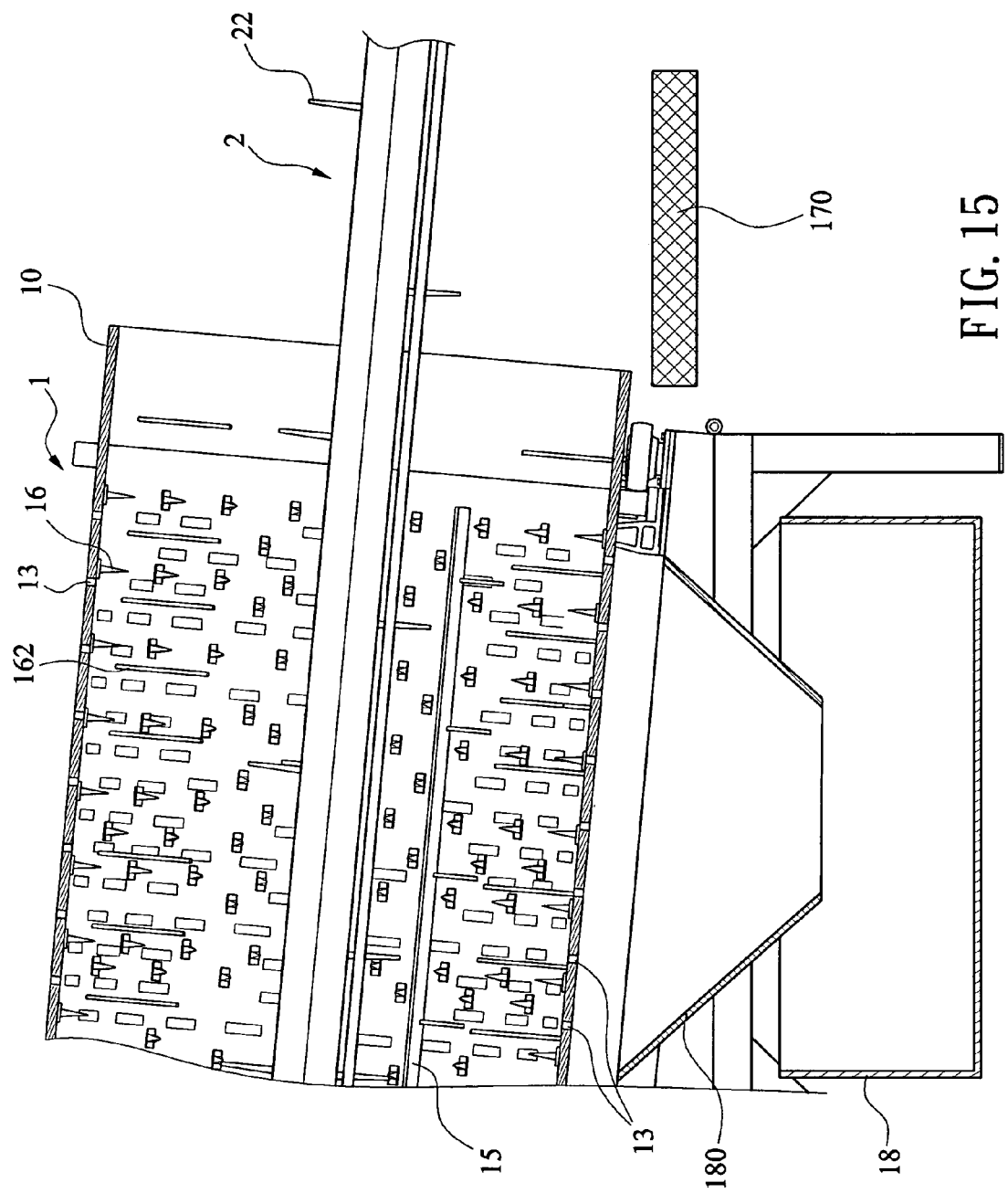
FIG. 15 is a longitudinal sectional view of a portion of the screen assembly in FIG. 11.
Figure 15A:
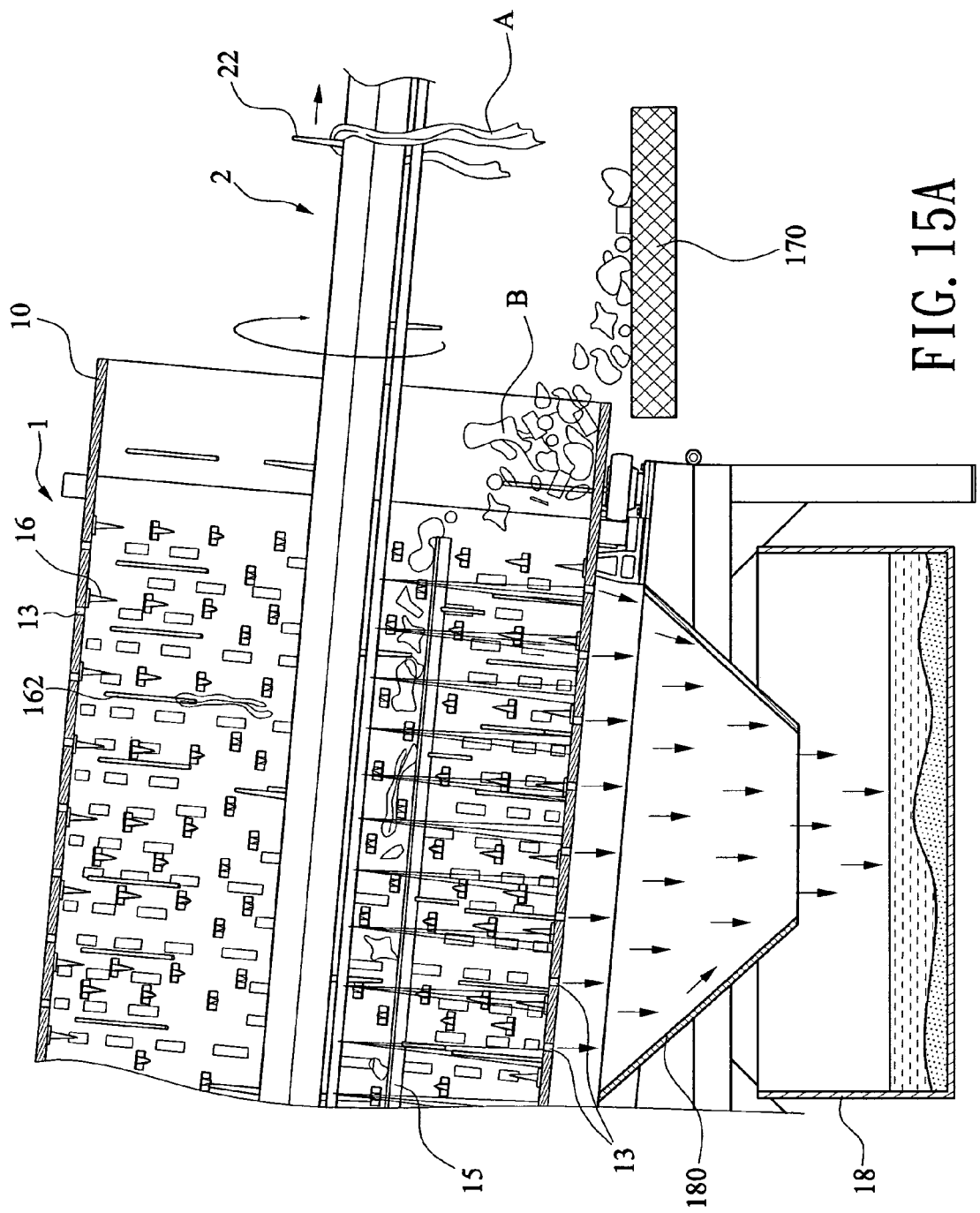
FIG. 15A is a view similar to FIG. 15 schematically depicting an operation performed by the screen assembly.

The holes 13 on the cylinder 10 may be clogged by garbage after a period time of operation. Thus, a washing assembly 3A is provided inside the cylinder 10, preferrably disposed along the lower sides of the housing 20 of the inclined nonrigid, elongate object collection assembly 2 extended from within the cylinder 10 to a place rearward of the cylinder 10. As shown in FIG. 14, the washing assembly 3A comprises two spaced sets of a pump 36, a pipe 37 having one end terminated within the cylinder 10 and formed as one or more nozzles 372 disposed facing the holes 13, and the other end connected to an outlet of the pump 36, and a valve 371 provided in the pipe 37 proximate the pump 36 for flow control. It is understood that the number of sets of pump, pipe, and valve may be more or less than above depending on applications.

Figure 10:
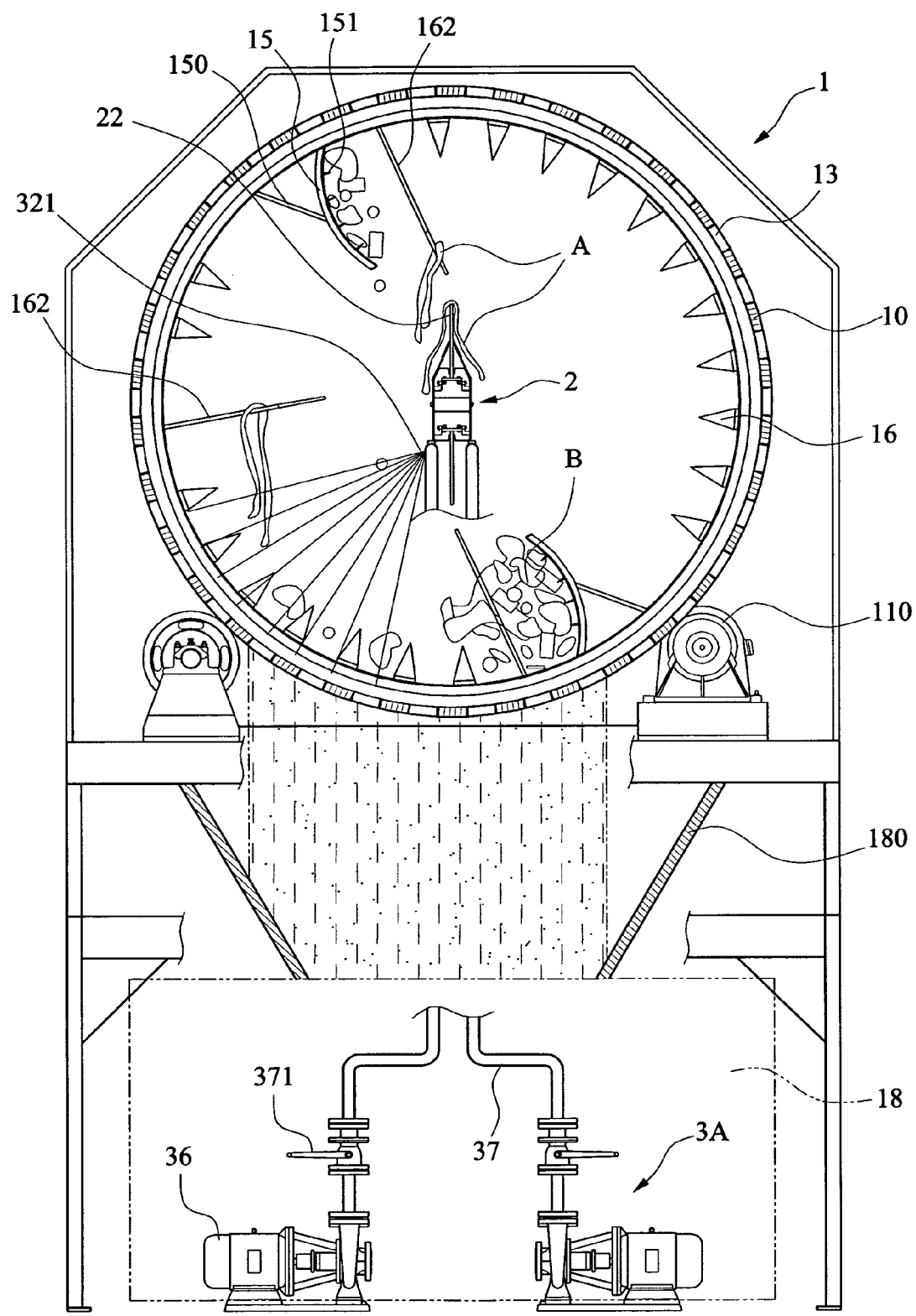
FIG. 10 is a rear view of FIG. 9 schematically depicting an operation performed by the screen assembly.
Figure 11:
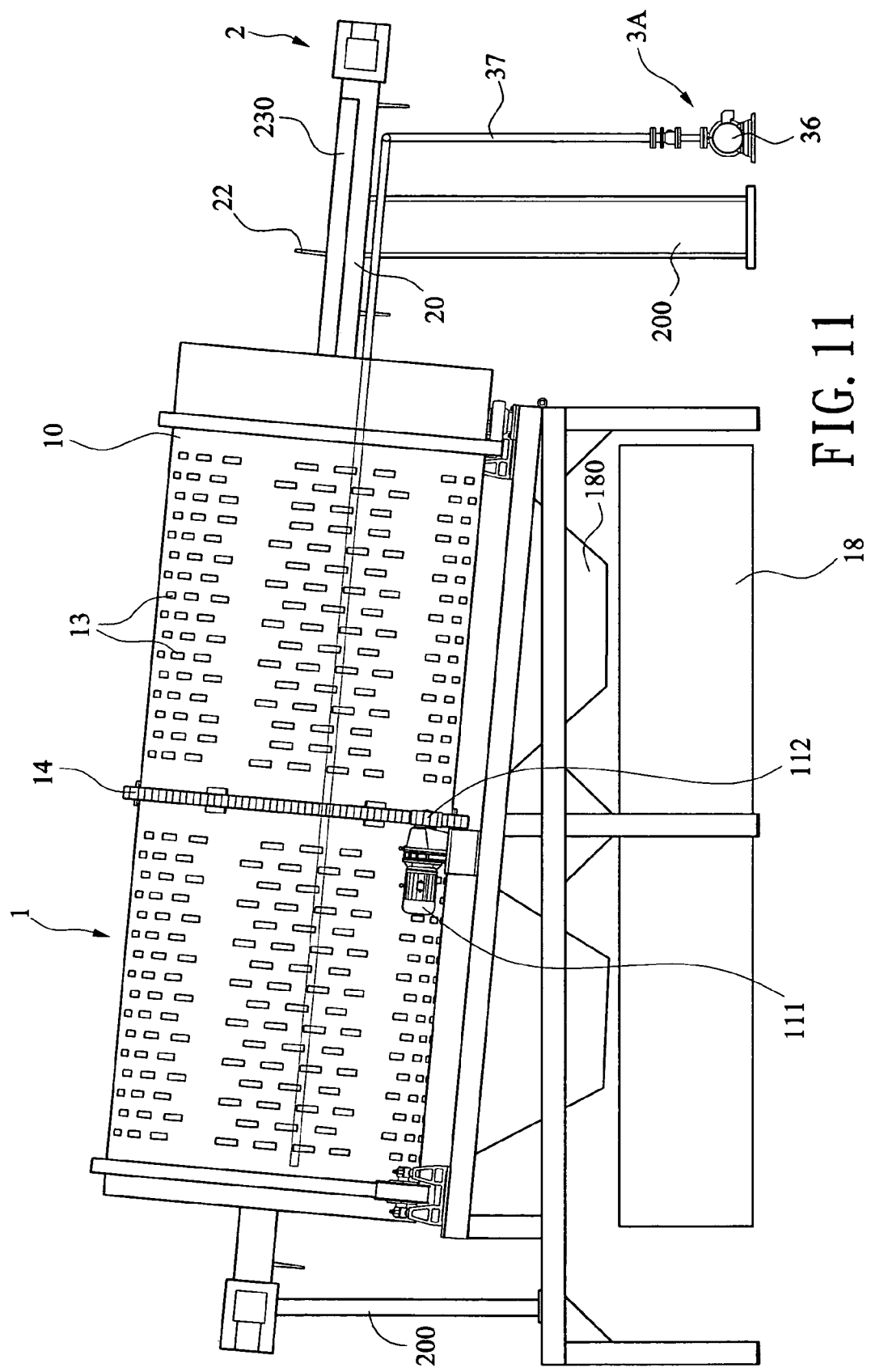
FIG. 11 is a side elevation of FIG. 9.
Figure 12:
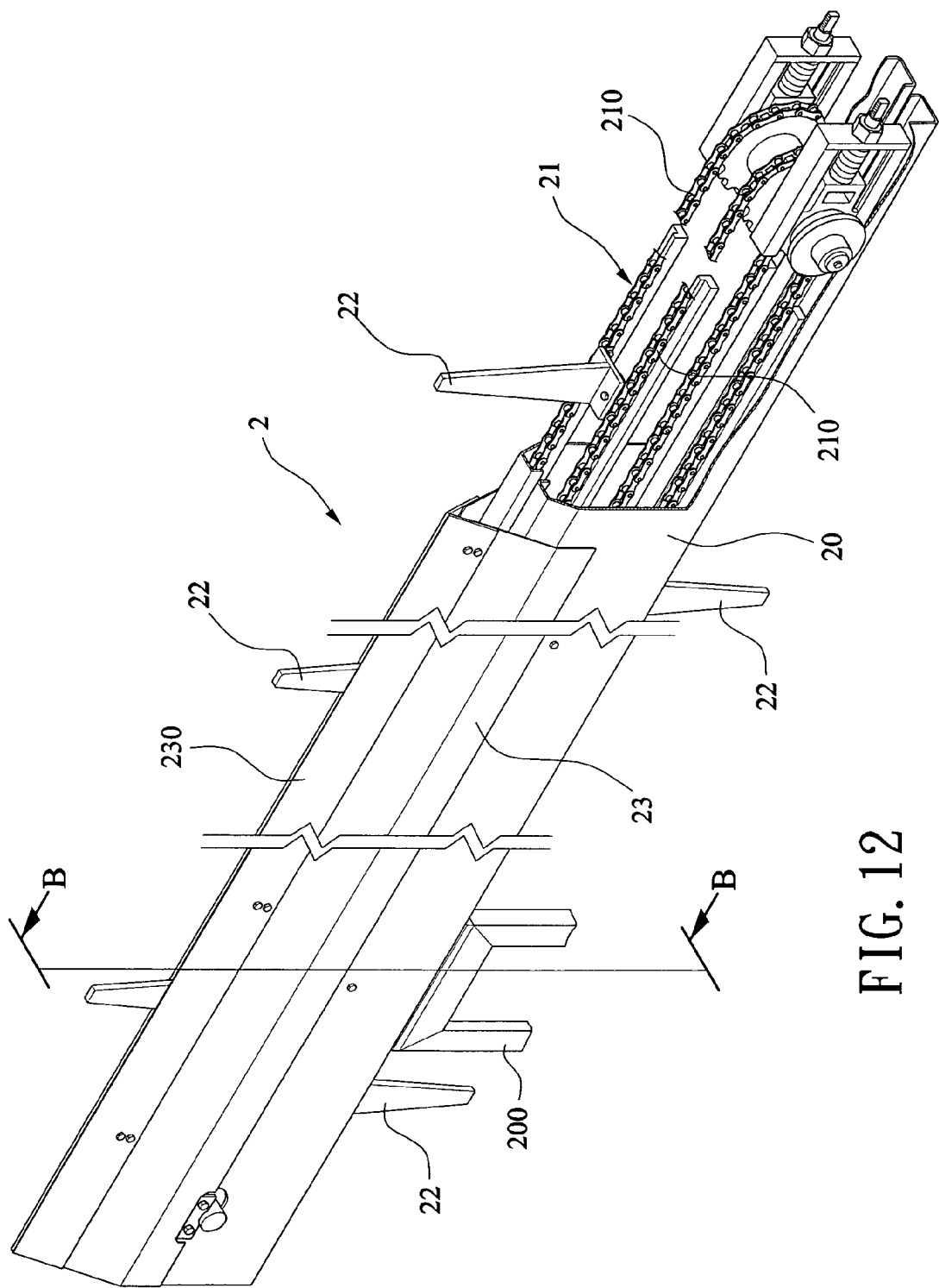
FIG. 12 is a perspective view of the nonrigid, elongate object collection assembly with a portion removed for showing interior details thereof.
Figure 13:
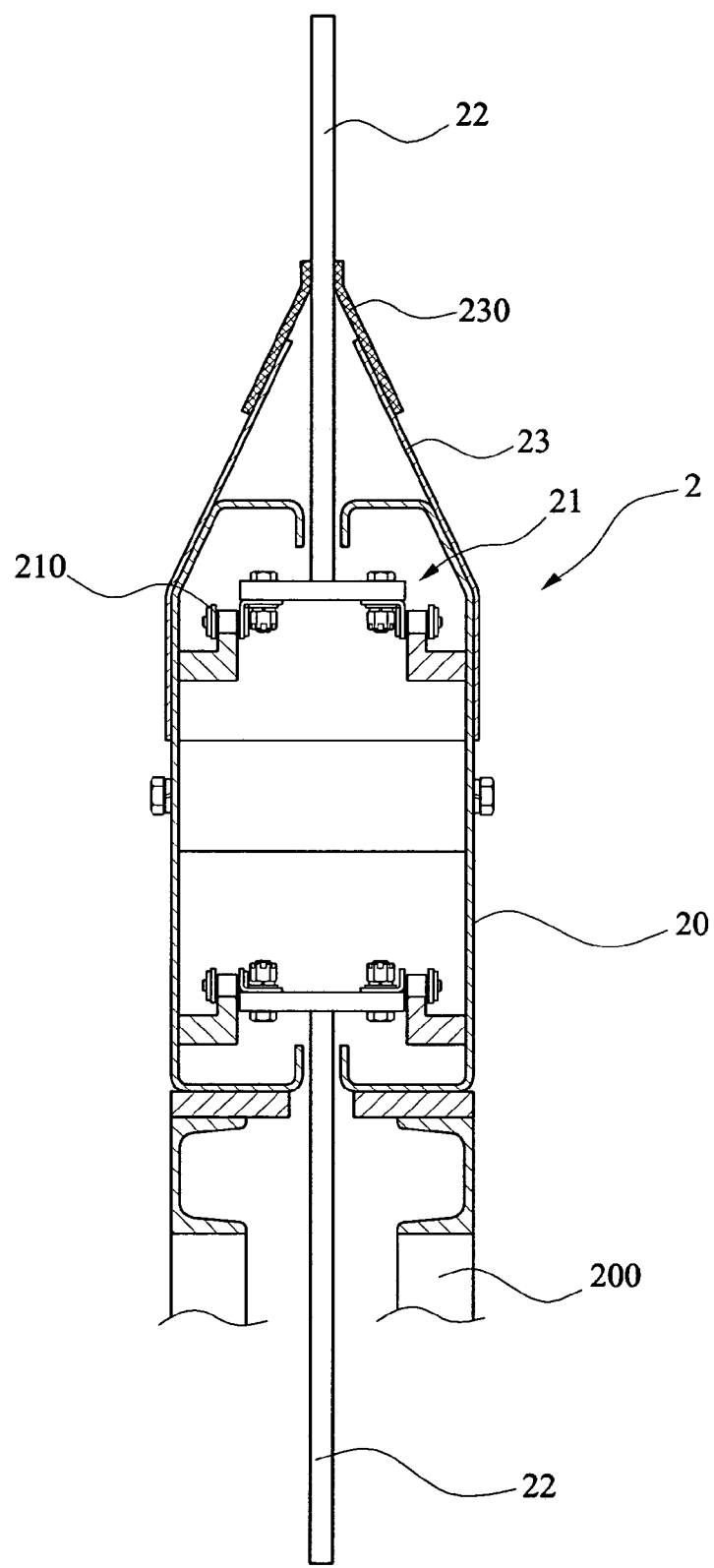
FIG. 13 is a sectional view taken along line A-A in FIG. 12.

In operation, first turn on the drive source 111 to rotate the cylinder 10 and turn on the drive source (not shown) to activate the nonrigid, elongate object collection assembly 2. The transmission 21 and thus the posts 22 move around. A plurality of garbage bags are thrown into the chute 121 of the feeding device 12 prior to conveying to the cylinder 10 by the first conveyor 120. The pointed blades 16 are adapted to pierce garbage bags rotating around the inner surface of the activating cylinder 10. Contents in the garbage bags are thus scattered in the cylinder 10. Also, the bars 162 are adapted to hold nonrigid, elongate objects (e.g., ropes, wires, etc.) A (as shown in FIG. 10) which may fall onto bottom of the rotating cylinder 10 when the bars 162 are disposed about top of the inner surface of the rotating cylinder 10 due to gravity. Moreover, the paws 151 of the plate 15 are adapted to hold nonrigid, elongate objects A and materials B other than nonrigid, elongate objects may fall from the plate 15 onto bottom of the rotating cylinder 10. Powder and small objects are contained in the materials B other than nonrigid, elongate objects in which powder passes through the holes 13 to fall onto the first container 18 under the cylinder 10. The nonrigid, elongate objects A held by the plate 15 may fall due to gravity when the plate 15 rotates to a highest point in the cylinder 10. The pointed top end of the post 22 thus may grab the fallen nonrigid, elongate objects A. It is often that the nonrigid, elongate objects A may extend across both sides of the roof 23 (see FIG. 10) since the nonrigid, elongate object A is elongate. At the same time, the posts 22 move along the roof 23 toward the second container 24. At the forward end of the housing 20 the nonrigid, elongate objects A may fall into the second container 24. The posts 22 may continue its movement by moving to a lower half of the housing 20 in one cycle.

Garbage materials other than nonrigid, elongate objects A and powder may move toward the rear end of the cylinder 10. Finally, they fall onto the second conveyor 170. These materials are then conveyed to a subsequent device P for further processing. Detailed description of the subsequent processing is also omitted herein because it is not the subject of the invention. In case of clog in the holes 13, an employee may turn on the washing assembly 3A to spray water onto the inner surface of the cylinder 10 through the nozzles 372 for washing the clogged holes 13. Alternatively, the activation of the washing assembly 3A may be set to start whenever garbage bags are brought into the cylinder 10. This has the advantages of washing off mud, dust, sand, oily materials, etc. and diluting hazardous materials. Thus, it also increases environmental safety in any subsequent processing including recycling.

While the invention herein disclosed has been described by means of specific embodiments, numerous modifications and variations could be made thereto by those skilled in the art without departing from the scope and spirit of the invention set forth in the claims.

What is claimed is:

1. An apparatus for disposing garbage bags comprising:
a support;
drive means disposed on the support;
a rotatable, hollow, cylindrical screen assembly driven by the drive means, the cylindrical screen assembly comprising a plurality of rectangular holes formed on an outer surface thereof, a lengthwise plate having a curved surface mounted on an inner surface thereof, the plate including a plurality of paws formed on the curved surface, and a plurality of pointed blades formed on its inner surface, the blades being disposed lengthwise and opposite the plate; and a nonrigid, elongate object collection assembly extended from a downstream end of the screen assembly through the screen assembly to a point in front of the screen assembly, the object collection assembly comprising an elongate housing of rectangular section, a gable roof mounted on the housing, a lengthwise gap formed on a top of the gable roof, and a container mounted below a downstream end of the object collecting assembly for collecting nonrigid, elongate objects dropped therefrom.

2. The apparatus of claim 1, wherein the screen assembly further comprises a cleaning assembly having a plurality of brush wheels mounted thereon at one longitudinal side of the screen assembly and the brush wheels faced the holes of the cylindrical screen assembly for cleaning the blockage in the holes.

3. The apparatus of claim 1, wherein the screen assembly further comprises a gear mounted around its intermediate portion, a pinion mounted at its one side and being in gear engagement with the gear, and a first drive source adapted to drive the pinion.

4. The apparatus of claim 1, wherein the nonrigid, elongate object collection assembly further comprises a second drive source, an endless transmission being driven by the second drive source and enclosed by the housing, the transmission including two parallel endless chains, and a plurality of equally spaced posts fixedly connected between the chains.

5. The apparatus of claim 1, wherein the screen assembly is inclined downward from its inlet end to its downstream end.

6. The apparatus of claim 1, wherein the support of the screen assembly further comprises a plurality of top rollers at either side of the screen assembly for rotatably supporting the screen assembly above a bottom of the support by a predetermined distance.

7. The apparatus of claim 2, wherein the cleaning assembly further comprises two spaced brackets, a drive shaft formed between the brackets, a plurality of brush wheels rotatably formed on the drive shaft, and a drive and transmission device, the drive and transmission device being adapted to push the brush wheels to contact the holes and rotate the brush wheels for cleaning the blockage in the holes.

8. An apparatus for disposing garbage bags comprising:
a support;
drive means disposed on the support;
a rotatable screen assembly including a hollow screening cylinder driven by the drive means, the cylindrical screen assembly comprising a plurality of rectangular holes formed on an outer surface thereof, a lengthwise plate having a curved surface mounted on an inner surface thereof, the plate including a plurality of paws formed on the curved surface, and a plurality of pointed blades formed on its inner surface, the blades being disposed lengthwise and opposite the plate;
a nonrigid, elongate object collection assembly extended from within the screening cylinder to a place rearward of the screening cylinder, the object collection assembly including an elongate housing of rectangular section, a gable roof mounted on the housing, a lengthwise gap mounted on a top of the gable roof, and a container mounted below a rear end of the object collection assembly for collecting nonrigid, elongate objects dropped therefrom; and
a washing assembly comprising one or more sets of a pump and a pipe having one end terminated within the screening cylinder and formed as one or more nozzles thereon for spraying water onto an inner surface of the screening cylinder, and the other end connected to an outlet of the pump.

9. The apparatus of claim 8, wherein the nonrigid, elongate object collection assembly further comprises a second drive source, an endless transmission being driven by the second drive source and enclosed by the housing, the transmission including two parallel endless chains, and a plurality of equally spaced posts fixedly connected between the chains.

10. The apparatus of claim 8, wherein the screening cylinder is inclined downward from its front end to its rear end.

11. The apparatus of claim 8, wherein the support of the screening cylinder comprises a plurality of top rollers at either side of the screening cylinder for rotatably supporting the screening cylinder above a bottom of the support by a predetermined distance.

* * * * *